United States Patent [19]
Griffiths et al.

[11] Patent Number: 5,625,574
[45] Date of Patent: Apr. 29, 1997

[54] METHOD AND DATA PROCESSING SYSTEM FOR MONITORING OPERATING STATES OF A TECHNICAL PLANT

[75] Inventors: Antony Griffiths, Kleinsendelbach; Joerg Fandrich, Moehrendorf; Helmut Müller, Nürnberg, all of Germany

[73] Assignee: Siemens Aktiengesellschaft, Munich, Germany

[21] Appl. No.: 300,434

[22] Filed: Sep. 2, 1994

[30] Foreign Application Priority Data

Sep. 2, 1993 [DE] Germany .......................... 43 29 714.5

[51] Int. Cl.⁶ ............................................. G06F 15/00
[52] U.S. Cl. .................................... 364/550; 395/915
[58] Field of Search ........................ 364/550, 551.01, 364/552, 554; 395/60–77, 904, 906, 911, 907, 912, 914, 915, 575

[56] References Cited

U.S. PATENT DOCUMENTS

| | | | |
|---|---|---|---|
| 4,642,782 | 2/1987 | Kemper et al. | 364/550 |
| 4,649,515 | 3/1987 | Thompson et al. | 371/15 |
| 5,081,598 | 1/1992 | Bellows et al. | 364/550 |
| 5,132,920 | 7/1992 | Bellows et al. | 364/551.01 |
| 5,133,046 | 7/1992 | Kaplan | 395/61 |
| 5,305,426 | 4/1994 | Ushioda et al. | 395/61 |
| 5,319,572 | 6/1994 | Wilhelm et al. | 364/510 |
| 5,319,580 | 6/1994 | Sakata et al. | 364/579 |
| 5,329,465 | 7/1994 | Arcella et al. | 364/551.01 |
| 5,369,756 | 11/1994 | Imura et al. | 395/575 |

FOREIGN PATENT DOCUMENTS

| | | |
|---|---|---|
| 0242609 | 2/1992 | European Pat. Off. . |
| 3812618 | 11/1988 | Germany . |
| 3832789 | 4/1989 | Germany . |
| 93/05477 | 3/1993 | WIPO . |

OTHER PUBLICATIONS

Patent Abstract of Japan No. JP 61-228501, Yukio et al Oct. 11, 1986.

Patent Abstract of Japan No. JP 2224096, Tetsuo et al, Sep. 6, 1990.

IEEE Publication No. 1, Jan. 1993, "Development of Expert System for Operation at Substation".

*Primary Examiner*—James P. Trammell
*Attorney, Agent, or Firm*—Herbert L. Lerner; Laurence A. Greenberg

[57] ABSTRACT

The method and the data processing system of the invention monitor the operating states of a technical plant. The operating states of the technical plant are characterized with measured values measured or modeled at a lowest level of the system. The plant is monitored with the measured values and with technological knowledge relevant to the operation of the technical plant stored in a memory of the data processing system. First, the measured values are processed and converted into plant symptoms specific of the associated operating states. Next, a diagnosis of the operational state of the plant is established from the plant symptoms and a significance value is assigned to the diagnosis, or a significance value is first assigned to the plant symptom and the diagnosis is prepared therefrom. The assignment of the significance is based on the technological knowledge. The diagnostic information is thus rated before it is appropriately forwarded to the user surface.

2 Claims, 4 Drawing Sheets

METHOD AND DATA PROCESSING SYSTEM FOR MONITORING OPERATING STATES OF A TECHNICAL PLANT

BACKGROUND OF THE INVENTION

Field of the Invention

The invention relates to a method and a data processing system for monitoring operating states of a technical plant. The term "technical plant" is understood to include fossil-fuel powered or nuclear power plants as well as manufacturing and production systems, for instance.

Monitoring systems in a power plant are intended to display the current operating states of the plant and to report any deviations from a proper operational state. One generally usable monitoring system has been heretofore known from German published, non-prosecuted patent application 38 12 618. A special troubleshooting apparatus which may be a component of a monitoring system is known from German published, non-prosecuted patent application 38 32 789.

Extensive acquisition of measured values for the operating states of all the plant parts is necessary for accomplishing the monitoring tasks. In a fossil-fuel gas and steam turbine power plant, these include components and auxiliary systems of the turbo sets, for instance. As their functional groups, these turbo sets include the gas or steam turbine and generators coupled to them via various shafts, and a steam generator or condenser. These plant parts may also be the components and auxiliary systems of the fuel/air supply, burner control, and cooling of the generators, for instance. Important components and auxiliary systems also include components and auxiliary systems of the gas or steam turbine. A signal or data exchange typically takes place via a bus system within a guide system common to the plant parts, with which guide system the plant operating states are controlled and monitored fully or partly automatically.

As the energy or work done by such plants is increasingly exploited, the demands for plant availability increase as well, and especially short down times for maintenance and repair are sought. In a combined gas and steam turbine plant, this means for monitoring the component and auxiliary systems of the generators and the turbines, alone, several thousand measured values must be evaluated discontinuously within more or less short time intervals. The attendant increase in complexity in the monitoring systems leads to increasing difficulties in manipulation by the human operators in a control room, both from the standpoint of a comprehensive overview of the current operating state of the plant and from that of early detection of defects and plant anomalies. For this purpose, European patent application EP 0 242 609 discloses a hierarchically arranged control system in which as the degree of automation increases, a pyramidally increasing densification of information in the data supplied by the detection of measured values is achieved. Neverthe- less, evaluating the measured values is left to the human operators, so that within a short time, for instance during especially critical operating states, high information densities must be handled by the operators.

SUMMARY OF THE INVENTION

It is accordingly an object of the invention to provide a method and data processing system for monitoring operating states of a technical plant, in particular of a gas and/or steam turbine plant, which overcomes the hereinafore-mentioned disadvantages of the heretofore-known devices of this general type and which allows for high operating safety and plant availability with especially high information densification at the same time on the basis of comprehensive measured value acquisition.

With the foregoing and other objects in view, there is provided, in accordance with the invention, a method of monitoring operating states of a technical plant with a data processing system, wherein technological knowledge relevant to an operation of the technical plant is stored in a memory of the data processing system, which method comprises:

a) converting, with the aid of technological knowledge relevant to an operation of a technical plant, measured values characterizing operating states of the technical plant into plant symptoms specific for respectively associated operating states;

b) assigning significance values to the plant symptoms on the basis of the technological knowledge; and c) diagnosing an operating state of the technical plant from at least one of the plant symptoms in dependence on a respectively associated significance value.

Alternatively, the method steps following step a) are defined in b) diagnosing an operating state of the technical plant from at least one of the plant symptoms;

c) assigning a significance value to a diagnosis obtained in step b) on the basis of the technological knowledge; and d) outputting the diagnosis, as a function of the significance value assigned thereto in step c), to a user surface of the technical plant.

In other words, the objects of the invention are attained in that for monitoring operating states of a technical plant by means of measured values characterizing the operating states of the technical plant and by means of technological knowledge, relevant to the operation of the plant and stored in memory, the measured values are converted, with the aid of the technological knowledge, into the plant symptoms specific for the associated operating states; significance values are assigned to these plant symptoms on the basis of the technological knowledge; and a diagnosis of the plant operating state is made from one or more plant symptoms as a function of the associated significance value.

The alternative way of attaining this object with respect to the method is attained if for monitoring operating states of a technical plant by means of measured values characterizing the operating states of the technical plant and by means of technological knowledge, relevant to the operation of the plant and stored in memory, the measured values are converted, with the aid of the technological knowledge, into the plant symptoms specific for the associated operating states; a diagnosis is made from one or more plant symptoms; significance values are assigned to this diagnosis on the basis of the technological knowledge; and the diagnosis is output, as a function of the associated significance value, to a user surface of the technical plant.

With the above and other objects in view there is also provided, in accordance with an additional feature of the invention, a data processing system for monitoring operating states of a technical plant, comprising:

a) a measuring level with means for obtaining measured values representative of operating states of a technical plant;

b) a coupling level receiving the measured values from the measuring level, the coupling level having means for processing the measured values and for associating measurement-point-specific identifiers with the measured values;

c) an administration level connected to the coupling level, the administration level including an identifier addressing block;

d) an action level connected to the administration level, the action level including an action block with means for carrying out at least one of logical and arithmetic operations for determining at least one of plant symptoms, diagnoses, and respectively associated significance values;

e) a data level communicating with the action level, the data level including data memory means for storing measured-value-specific rules, confidence rules, confidence thresholds, plant symptoms, diagnoses and measured values; and f) a display level with a user surface communicating with the data level and the action level.

Alternatively, the foregoing feature a) is replaced with a simulation level with a data memory storing and issuing measured values characterizing operating states of a technical plant.

In other words, the data processing system includes a measuring level with means for detecting measured values characterizing the operating states of a technical plant; a coupling level with means for preparing the measured values with the addition of a measurement-point-specific identifier; an administration level with an identifier addressing block; an action level with an action block for determining plant symptoms and/or diagnoses as well as their associated significance values by carrying out logical and/or arithmetic operations; a data level with at least one data memory for storing measured-value-specific rules, confidence rules, confidence thresholds, plant symptoms, diagnoses and measured values; and a display level with a user surface.

An alternative way of attaining this object with respect to the apparatus is attained if in the aforementioned apparatus the measurement level is replaced with a simulation level with a data memory for measured values characterizing the operating states of a technical plant.

In this way it is possible to detect the current operating state of the technical plant initially from the measured values. These measured values are then converted into plant symptoms, on the basis of rules derived from the technical knowledge; these symptoms describe the measured value free of its absolute magnitude and in a form checked for relevance of the particular measured value for the operating state of a particular partial plant process. From the measured-value-specific rules, which are essentially associative functions, fuzzification of the measured values takes place. One can then proceed advantageously in two different ways. In the first, the symptoms are checked for relevance in terms of trouble-free plant operation using further rules derived from technical knowledge, namely confidence rules. The significance value thereupon assigned to the plant symptom is accordingly a measure of how greatly the operating state matching the plant symptom deviates from a preferred operating state and is thus a measure for the trouble in the plant. Since a diagnosis of the operating state of the plant is made from one or more plant symptoms as a function of the particular associated significance value, an especially high information densification is involved, because from the significance values, a selection which is advantageous to plant operation can be made among the available plant symptoms for making a diagnosis.

In the second of these ways, a diagnosis is first derived from one or more plant symptoms, and this diagnosis is then checked for its relevance with respect to trouble-free plant operation, using other rules derived from the technological knowledge. The significance value thereupon assigned to the diagnosis is likewise a measure for how greatly the operating state matching the diagnosis deviates from a preferred operating state. It is accordingly a measure for the trouble in plant operation. The significance value assigned accordingly to this diagnosis makes an especially high information densification possible, since from the significance values a decision is made as to when a diagnosis is output to the user surface, and when it is not.

To attain further processing and addressing of the measured values for safe operation, it is advantageous if the measured values are provided with a measurement-point-specific identifier and status information and an address by means of the identifier. This creates a so-called data telegram which can be reliably addressed and can be again found in a memory of the data processing system in an error-free manner. From the status information, examples of which are 0, NOT READY, NOT FOUND, BAD VALUE, an evaluation of the degree of confidence of the measured values can be carried out.

In order to carry out the conversion of the measured values or of the data telegram provided with the identifier and the status information, into plant symptoms especially quickly and with little expense for arithmetic and logical operations, it is appropriate on the basis of the identifier, to apply identifiable measured-value-specific rules of the technological knowledge to the measured values; wherein for the plant symptoms, the identifiers of the measured values that originally call up the plant symptoms are adopted. In this way, the number of rules that must be applied to a measured value is unequivocally assigned and limited. The individual measured-value-specific rules of the technological knowledge may for instance be comparisons between command and actual values, limit value checks, and the application of functions, such as polynomials, to the measured values. For monitoring leakage in the hydrogen cooling system of a generators bank, for instance, symptoms are derived that make statements, such as "hydrogen throughput increasing slightly", "hydrogen pressure dropping slightly", "hydrogen temperature virtually constant", "hydrogen concentration in generator area increasing very slightly", etc. However, plant symptoms that were derived from implausible measured values, for instance, may also be further processed. The status information transferred, such as "BAD VALUE", assures the identification of such "defective" plant symptoms.

For fast handling of such plant symptoms, it is suitable if for assigning the significance values to the plant symptoms, on the basis of the identifer, identifiable confidence rules of the technological knowledge, which determine the significance value, are assigned to the plant symptoms. This may for instance be expressed as a standardized significance value that is between 0 and 1, and which for the plant symptom "throughput rising slightly" is 0.2, for instance.

To increase the information density in a simple but operationally safe way, it is advantageous if confidence thresholds are assigned to the plant symptoms or diagnoses on the bases of the technological knowledge.

At the same time, this is a prerequisite for another advantageous feature of the invention, which provides making a diagnosis of the operating state from the plant symptoms if the significance value belonging to the plant symptom exceeds the confidence thresholds belonging to that plant symptom. Alternatively, a diagnosis may be made from the plant symptoms that is initially transferred to the user surface only if the significance value associated with the diagnosis exceeds the associated confidence threshold. In this way, from operating experience on which the technological knowledge is based, an especially weighted selection condition is made, so that the operators in the control room need to handle a diagnosis only in situations that are especially critical to trouble-free plant operation. This means that the demands made of the operators are restricted to situations in which further monitoring of the measured values and fully automatic adjustment of actuators changed by the plant operating state cannot alone necessarily lead to success.

The operators gain a rapid overview of the current operating state of the plant if the plant symptom whose associated symptom description, that is, causes and consequences, and a proposed therapy based on the technological knowledge for that plant symptom or diagnosis is output on the basis of the diagnosis to the user surface of an electronic data processing system. This enables early recognition of incipient defects and enables reaction to the current plant situation so as to bypass the defect. This can proceed so far that, if a diagnosis is present, the requisite provisions for trouble-free further operation can be initiated, or the plant or plant parts can be turned off, which can be done in a manner that is either dependent on the human operators, or independent of them.

Special demands of the operating staff and of the control system are made if more than one plant symptom worthy of diagnosis or diagnoses are present at the same time. An embodiment advantageous for plant operation is attained if a plurality of plant symptoms requiring diagnosis are present, a diagnosis is given priority beginning with the plant symptom having the highest significance value or the diagnosis having the highest significance value.

Operating safety and plant availability can be further increased by providing that via the user surface, the measured-value-specific rules, the confidence rules and the confidence thresholds are modified as needed. As a result, the confidence threshold of a plant symptom that is frequencty further processed into a diagnosis, for instance, yet is not sufficiently relevant to the plant operating state to cause that symptom to have to be further processed into a diagnosis so often, is retroactively raised for that plant symptom. The associated significance value of the plant symptom must then be necessarily higher than the raised confidence threshold, so that a dianosis can be made from the plant symptom.

Other features which are considered as characteristic for the invention are set forth in the appended claims.

Although the invention is illustrated and described herein as embodied in a method and data processing system for monitoring operating states of a technical plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
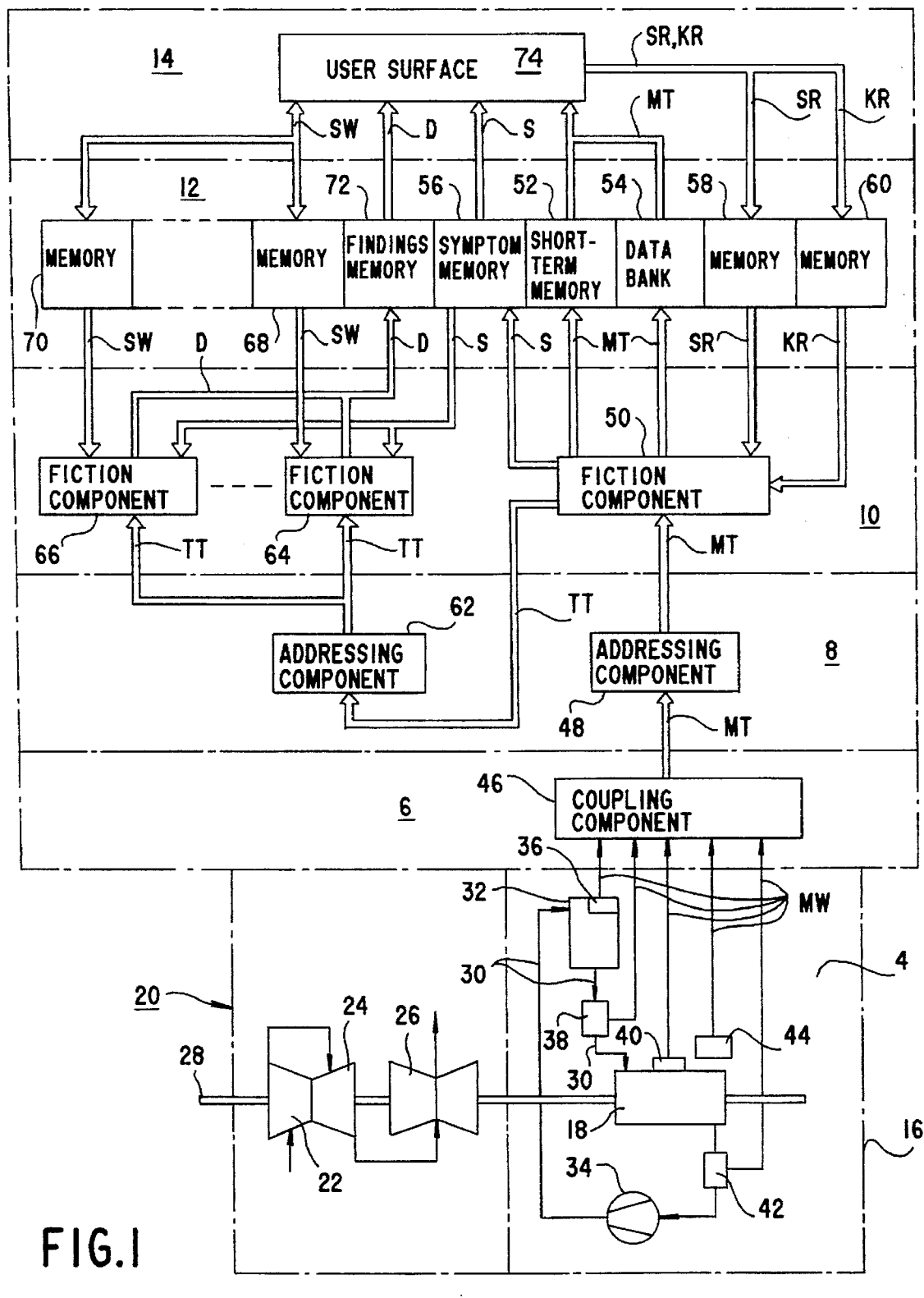
FIG. 1 is a function diagram of an apparatus for monitoring operating states of a technical plant.

Referring now to the drawings and first, particularly, to FIG. 1 thereof, an apparatus, hereinafter called the diagnostic system 2, for monitoring operating states of a technical plant includes building blocks and components arranged in six levels 4, 6, 8, 10, 12 and 14 stacked one above the other and named below in the course of the description of the function diagram. The technical plant to be monitored in the exemplary embodiment is a gas and steam turbine power plant, which is merely diagrammatically suggested here.

The plant process 16 to be monitored with the diagnostic system 2 is, in the exemplary embodiment, the hydrogen coolant loop of a generator 18. The generator 18 is disposed on a common shaft 28 along with a steam turbine 20, which includes a high-pressure part 22, a medium-pressure part 24, and a low-pressure part 26. The generator 18 is driven by means of the steam turbine 20. In order, a gas compressor 34, a hydrogen reservoir 32 with an integrated cooling stage, a hydrogen flow, temperature and pressure meter 38, the heat exchanger conduits of the generator 18, and a further hydrogen flow, temperature and pressure meter 42 are incorporated into a hydrogen line 30 in the closed hydrogen coolant loop. For monitoring the hydrogen coolant loop, a fill level meter 36, a generator temperature meter 40, and a hydrogen detector 44 disposed in the immediate surroundings of the generator 38 are provided.

These measured value or data acquisition means 36, 38, 40, 42 and 44 send their data or measured values MW from the first level, hereinafter called the measurement level 4, each via their own data lines, to a second level, hereinafter the coupling level 6, to a coupling component 46. This coupling component 46 prepares the measured values MW for further processing, which specifically means that the measured values MW are digitized, prepared syntactically, and provided with a measurement-point-specific identifier and status information.

The term "syntactic preparation" is understood to mean that the measured values MW for instance are converted into integer values and provided with control characters in such a way that this integer value, comprising three bits, is transmitted. The three bytes for instance are in the order of the most significant bit, the medium significant bit and least significant bit. However, the measured values MW may equally well be transmitted in the form of real numbers that are eight bits long.

From the coupling component 46, the now-prepared measured values MW are transmitted in the form of a measured value telegram MT to a coupling addressing component 48 in a third level, hereinafter called the administration level 8. From the identifier of the measured value telegram MT, the coupling addressing component 48 addresses the measured value telegram MT to the following components and here transmits the addressed measured value telegram MT to a fourth level, hereinafter called the action level 10, to a first action component 50. The function of the action component 50 will be described in further detail below in conjunction with FIG. 2. At this point, it will merely be noted that the measured value telegram MT, by means of the action component 50, is transmitted directly to a short-term memory 52 and to a data bank 54. The short-term memory 52 and the data bank 54 are located in a fifth level, hereinafter called the data level 12. Also located in this data level 12 are a symptom memory 56, a memory 58 for measured-value-specific rules SR, which are specific for the measured value telegram MT, and a memory 60 for confidence rules KR, or in other words including qualification-determining association function. When a measured value telegram MT arrives at the action component 50, data are called up from the memories 58, 60. In the action component 50, the measured value telegram MT is qualified to make plant symptoms S, which are output to the symptom memory 56. The plant symptoms S are also assigned significance values, which are output in the form of a trigger telegram TT to a further coupling addressing component 62.

The trigger telegram TT returns hierarchically to the data level 12 and in the coupling level 8, from the associated identifier, is addressed by the coupling addressing component 62 to one of the further action components 64, 66. These further action components 64, 66 are embodied as inference servers, which are addressed in accordance with their address by a trigger telegram TT specific for that address and thereupon call up from the symptom memory 56 the plant symptom S, identifiable by the identifier transmitted with the trigger telegram TT, or a plurality of plant symptoms S assembled into a symptom block.

An action component, for instance the action component 64, which loads a plant symptom S from the symptom memory 56 after the arrival of a trigger telegram TT, calls up symptom-specific knowledge SW, i.e. the associated symptom description SB, the associated diagnostic text DT, linking rules VR, and at least one therapy proposal TV derived from the plant symptom S, from a memory 68 for symptom-specific knowledge SW.

From the characteristics of the plant symptom S, it may also be necessary, for instance from the linking rules VR, for the action component 64 addressed here to require symptom descriptions SB or diagnostic texts DT from other symptom-specific data banks, such as a memory 70 for symptom-specific knowledge SW, so that an unequivocal and informatively well-rounded diagnosis D can be furnished. In the exemplary embodiment, the memories 68, 70 with the symptom-specific knowledge SW are interlinked in such a way that data exchange with one another is possible in any direction.

The diagnosis D produced by means of the action component 64 or the action component 66 is stored in a result memory or findings memory 72 located in the data level 12. From the findings memory 72, the diagnosis D, once achieved, is transmitted directly to a user surface 74, which is located in a sixth level, hereinafter called the display level 14. The user surface 74 includes one or more terminals, in which the diagnosis D is displayed visually for the operating staff of the power plant. If needed, the operating staff can call up, in addition to the diagnosis D displayed, other symptom-specific knowledge SW, the plant symptom or symptoms S, and the measured value telegram MT in the user surface 74, to enable a comprehensive evaluation of the diagnosis D displayed. Thus from these data the diagnostic findings can be carried out, and knowledge gained in this way can also be stored from the user surface 74 in the associated memories 58 or 60 of the data level 12, the knowledge being in the form of new measured-value-specific rules SR and confidence rules KR.

The diagnostic system 2 shown in FIG. 1 in particular meets the requirement for the highest possible information density, so that the power plant operating state need be made available to the operating staff in an especially user-friendly form only in especially important cases. This requirement is essentially accomplished by the production of the trigger telegrams TT, which permit the diagnosis D from a plant symptom S only whenever a trigger telegram TT is in fact transmitted from the first action component 50.

The requirement for the maximum possible information density is also achieved if, as an alternative to the embodiment described above, the procedure is slightly different. The provision then is that initially each plant symptom S is accompanied by a trigger telegram TT, which enables the production of the diagnosis D pertaining to the plant symptom S. Only then is this diagnosis D checked for its relevance for trouble-free power plant operation by means of a comparison with the confidence threshold KS' (FIG. 6) pertaining to the diagnosis D. The diagnoses D, which then exceed the associated confidence thresholds KS', can for instance result in an alarm signal at the user surface 74 or can be output in the form of a "highlighted message" to a data display unit in the user surface 74; the highlighted message does not disappear and scroll off the data display unit until the operating state that initiated the diagnosis D has been remedied.

Figure 2:
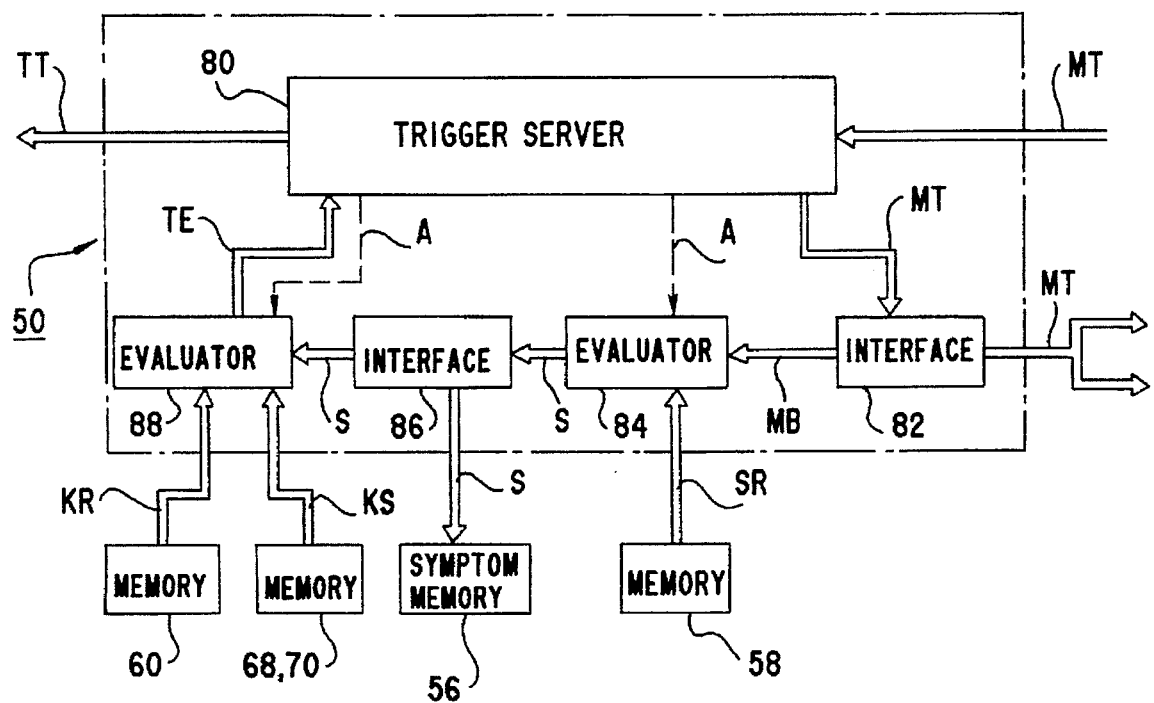
FIG. 2 is a function diagram of a first action block of the apparatus of FIG. 1.

FIG. 2 is a detailed function diagram of the first action component 50. The measured value telegram MT, in other words the syntactically prepared measured values MW, provided with an identifier and status information, travel from the coupling addressing component 48 first to a so-called trigger server 80. The trigger server 80 pushes the measured value telegram MT to an interface or port 82. The interface 82 stores the measured value telegram MT temporarily and transmits the measured value telegram MT directly on to the short-term memory 52 and the data bank 54, on the one hand. On the other hand, the interface 82 now sends the measured value telegram MT—block by block in the form of measured value blocks MB—to a measured value evaluator 84. An activation A of the measured value evaluator 84 is brought about by the arrival of a measured value telegram MT in the trigger server 80. The individual measured value blocks MB contain the syntactically prepared measured value MW, its associated identifier, its associated status information, and also control characters for identifying the beginning and end of the measured value block MB and for separating the measured value, the identifier and the status information.

The measured value evaluator 84 first, in accordance with the identification of the measured value block, processes the measured value, such as by linear regression, by integration, etc.

Moreover, the measured value evaluator 84, based on the identification from the identifier, loads identifiable rules SR, which are specific only for this measured value and in other words also include the association functions required for fuzzification, from the associated memory 58. Precisely these rules SR are identified from the identifier that is transmitted in the measured value block MB. These measured-value-specific rules SR may for instance be command value/actual value comparisons, threshold value checks, or mathematical calculations. From these rules, which have been learned from empirical, technological knowledge with respect to this measurement point and the usual operating states for that measurement point, the originally present measured value MW is converted into a plant symptom S. From a sharp measured value for the hydrogen throughput of the flow meter 38, the statement "throughput rising slightly" is then derived, for instance, as a plant symptom S. Other statements may for instance be "pressure dropping slightly", "temperature nearly constant" or "hydrogen concentration in ambient air rising very slightly".

A further interface 86 directly transmits the plant symptom S that has been formed on to the symptom memory 56 and to a symptom evaluator 88. The task of the symptom evaluator 88 is then to check the plant symptom S, either individually by itself or in conjunction with other plant symptoms S, as to its or their relevance to trouble-free operation of the power plant. Finally, it decides whether a diagnosis D should be made from the plant symptom S. To that end, the symptom evaluator 88 loads up the confidence rules KR pertaining to this plant symptom S (identified from the identifier) from the associated memory 60 and loads up the symptom knowledge SW from the associated memory or memories 68, 70. From the confidence rules, the plant symptom S is assigned a significance value. This significance value is between 0 and 1, for instance, on a standardized scale. The confidence threshold KS pertaining to this plant symptom S (likewise identified from the identifier) loaded along with the symptom knowledge now enables a comparison to be made between the significance value and the confidence threshold KS. The statement "throughput rising slightly" can be weighted in such a way, for instance, that it is assigned a significance value that is below the confidence threshold. Consequently, no diagnosis is made from this plant symptom S. The statements "pressure dropping slightly" and "temperature nearly constant" may also, in terms of their significance, be below their associated confidence thresholds KS.

For the plant process 16 to be monitored, in this case the hydrogen coolant loop of the generator 18, the statement "hydrogen in ambient air rising very slightly" is markedly more relevant. The significance value of this plant symptom S exceeds the associated confidence threshold KS; that is, based on the technological knowledge, trouble-free power plant operation may be threatened by this plant symptom S. The symptom evaluator 88 then sends a trigger event TE to the trigger server 80, which thereupon issues a trigger telegram TT. This trigger telegram TT likewise includes the identifier transmitted to the plant symptom S by the measured value telegram MT, so that only the action component 64 or 66, associated with this identifier, can load the plant symptom S from the symptom memory 56. Because of the association of significance values and the comparison of the significance values with confidence thresholds KS in the symptom evaluator 88, a very high degree of information densification is achieved.

Figure 3:
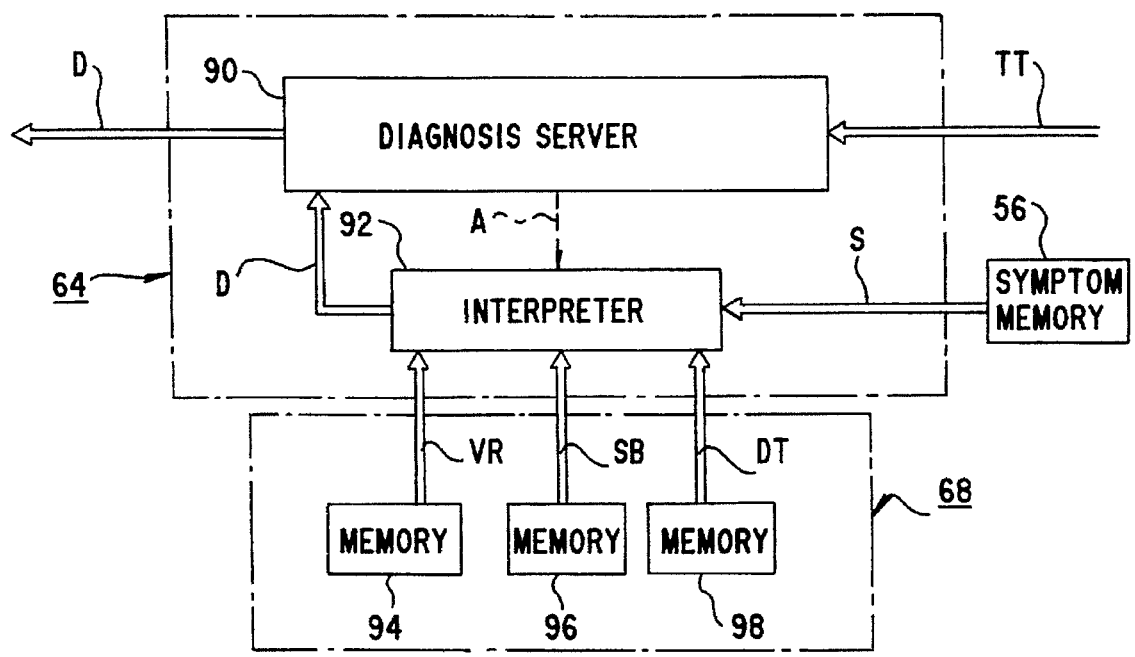
FIG. 3 is a function diagram of a second action block of the apparatus of FIG. 1.

FIG. 3 is the function diagram from the second action component 64. A trigger telegram TT issued by the trigger server 80, after being addressed, arrives at a diagnosis server 90 of the associated action component 64. The diagnosis server 90 causes an activation A of a diagnosis evaluator or interpreter 92. The diagnosis interpreter 92 thereupon calls up the plant symptom S, which trips the associated trigger telegram TT, from the symptom memory 56. In the present case, the symptom reads "hydrogen concentration in ambient air rising very slightly". From the symptom-specific memory 68, the symptom-specific knowledge SW is called up; specifically, what is called up is linking rules VR, the symptom description SB and the diagnosis text DT, which are stored in separate memories 94, 96 and 98, respectively.

Particularly with the linking rules VR, the diagnosis evaluator 92 causes weighting of the plant symptom S leading to the diagnosis D with further plant symptoms S, for instance from the symptom memory 56, whose significance values have remained below the confidence thresholds KS.

For instance, if the plant symptoms "throughput rising slightly" and "pressure dropping slightly" are additionally taken into account, then leakage is likely. However, since the statement "temperature nearly constant" is also being reported, i.e., the temperature of the generator 18 is nearly constant, the coolant loss is not yet so great that the cooling capacity at the generator 18 is dropping dangerously sharply. Nevertheless, a leakage check must be automatically initiated immediately, because of the plant symptom "hydrogen concentration in ambient air rising very slightly". This leakage check includes a check of the measuring sensors, for instance, first, before the actual search for the leak and the leakage location is begun.

The diagnosis D produced by means of the diagnosis evaluator 92 is carried directly on to the diagnosis server 90, which loads the diagnosis D into the findings memory 72 and outputs it directly to the user surface 74. In the exemplary embodiment, after the leakage check has been performed automatically, the operating staff can be told, for instance in the form of a finding, that the leakage is at the entrance to the hydrogen reservoir 32, and that the shaft seals in the screw connection of the hydrogen line 30 and the hydrogen reservoir 32 are suspected to be defective. The string of logical and arithmetic operations, beginning with the measured value MW, that led to the diagnosis D can be carried out seamlessly by the staff via the user surface 74. When the plant is in operation, it may be found that for certain plant symptoms S the confidence rules KR have been derived overly broadly, or that a confidence threshold KS was set overly high based on the technological knowledge TW. Via the user surface 74, the staff can load such information gained by experience into the memories 58, 60, 68, 70 affected by the modifications.

Figure 4:
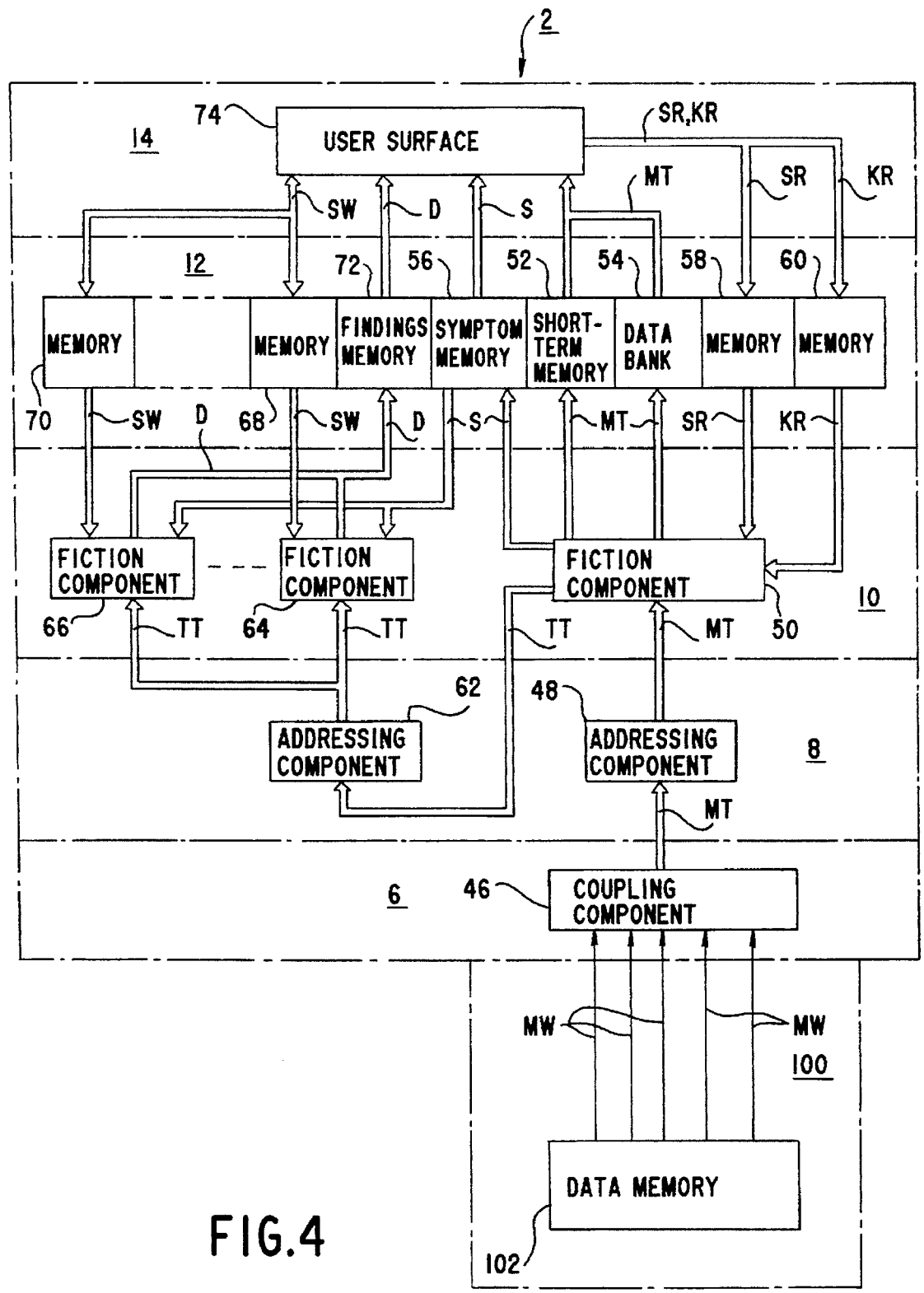
FIG. 4 is a function diagram of a monitoring apparatus according to FIG. 1 with a simulation plant.

FIG. 4 again shows the function diagram of the same diagnostic system 2 as in FIG. 1. Compared with FIG. 1, a change here is that the measurement level 4 is replaced with a simulation level 100. The simulation level 100 essentially includes a data memory 102 for measured values MW. These measured values MW may for instance derive from an interval in operation of the technical plant process 16, in this case the hydrogen coolant loop of the generator 18. The measured values MW stored in the data memory 102 may be called up for this purpose from the data bank 54. With this embodiment of the invention, the operating staff is given the capability of simulating operation of the technical plant and, by manipulating the stored measured values MW, of artificially producing especially critical plant states. These simulations of operating states improve knowledge about the generally prevailing complexity of the technical plant. This improved knowledge in turn expands the technological knowledge TW and is expressed in modified, now more finely tuned rules SR, KR, confidence thresholds KS, and suitably adapted symptom-specific knowledge SW.

The technological knowledge TW is stored in the data level 12 and is broken down into the following categories:

symptom-specific knowledge SW stored in the memories 68, 70;

the measured-value-specific rules SR stored in the memory 58; and the confidence rules KR stored in the memory 60.

The diagnostic system 2 explained in conjunction with FIGS. 1–6, because of the layout described, is suitable for monitoring the operating states of various technical plants. The technological knowledge TW significant for the particular plant is contained in the measured-value-specific rules SR, the confidence rules KR, and the confidence thresholds KS that are contained in the symptom-specific knowledge SW.

Figure 5:
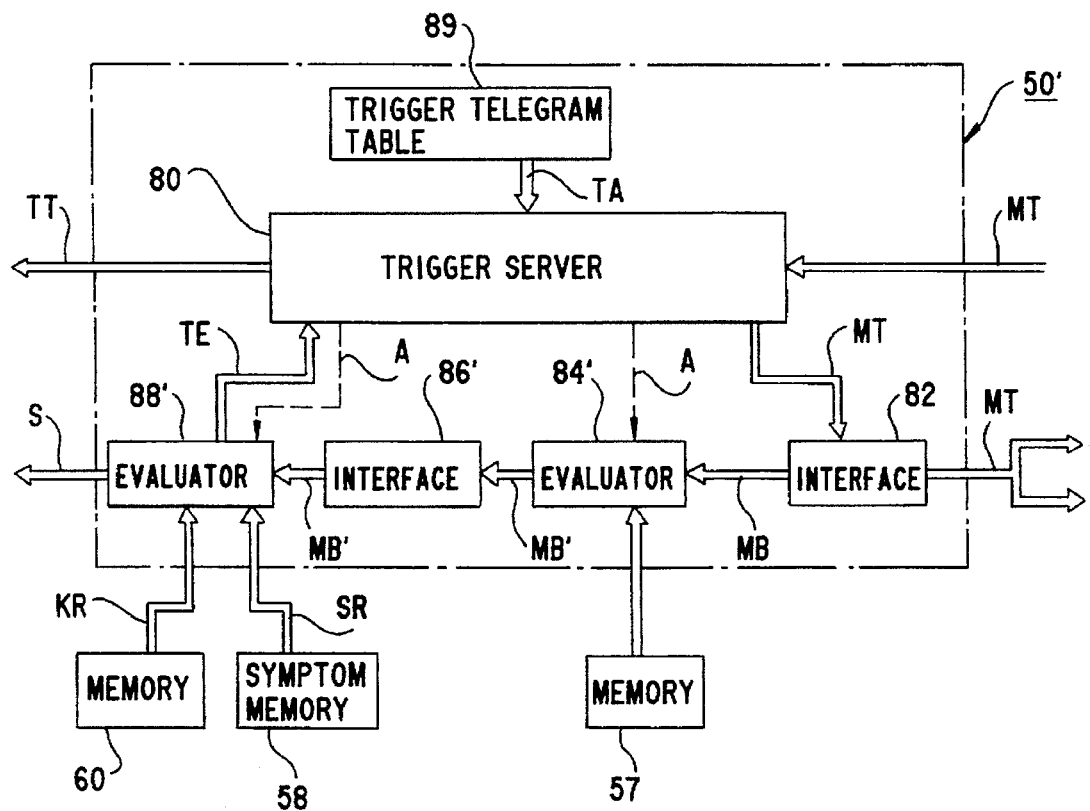
FIG. 5 is a function layout of a first action block, modified slightly over FIG. 2, of the apparatus of FIG. 1.

The function diagram shown in FIG. 5 of a first action component 50', modified slightly compared with FIG. 2, also differs only slightly in layout from the function diagram of FIG. 2. A measured value telegram MT arriving from the coupling addressing component 48 at the trigger server 80 is once again applied to the interface 82 and carried on to a measured value evaluator 84' as well as to the short-term memory 52 and the data bank 54. Once again, an activation A of the measured value evaluator 84' is occasioned by the arrival of the measured value telegram MT from the trigger server 80. In this embodiment, preparation of the measured value block MB is now first carried out in the measured value evaluator 84'. This preparation includes statistical operations, such as linear regression, and arithmetic operations, such as differentiation, integration and averaging. The requisite mathematical functional regulations and data—identifiable from the identifier and the status information of the measured value block MB—are loaded from a memory 57.

The measured value block MB' prepared in this way is loaded by the measured value evaluator 84' into a further interface 86'. Simultaneously with the activation A of the measured value evaluator 84', a symptom evaluator 88' is also activated. As long as the measured value evaluator 84' is for instance still occupied with processing the measured value block MB, the symptom evaluator 88' loads measured value blocks MB' that have the status NOT READY. This means that the trigger event TE sent to the trigger server 80 does not occasion any trigger telegram TT. However, if the modified measured value block MB' has the status 0, for instance, which stands for a correct measured value MW, then the symptom evaluator 88' loads the measured-value-specific rules SR, in other words including the associative functions required for the fuzzification, and the confidence rules KR. From these rules, the modified measured value block MB' is converted into a plant symptom S, which is loaded into the symptom memory 56. This plant symptom S is moreover accompanied by the identifier and the status information of the measured value block MB. At the same time, this plant symptom S is sent as a qualified trigger event TE to the trigger server 80. From a trigger event and trigger telegram table 89, the trigger event TE is linked with the trigger telegram TT using trigger addresses TA loaded from the table 89.

Figure 6:
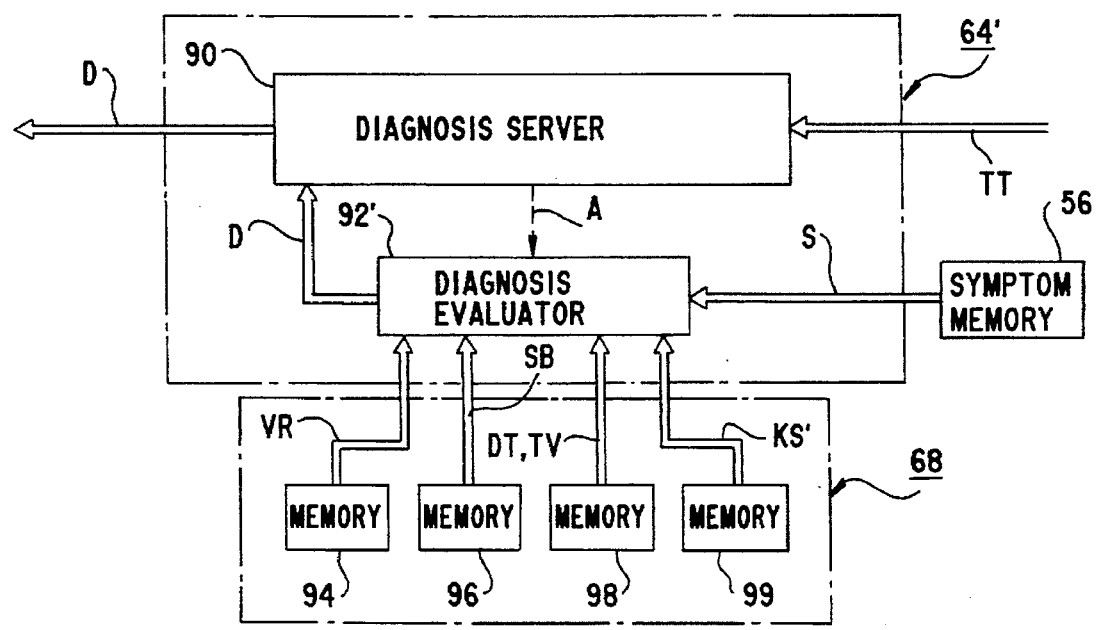
FIG. 6 is a function layout of a second action block, modified slightly over FIG. 3, of the apparatus of FIG. 1.

The second action component 64', shown in terms of its function diagram in FIG. 6 and modified slightly compared with FIG. 3, in this exemplary embodiment always receives a trigger telegram TT if a plant symptom S has been formed from a measured value block MB' that has the status information "0". A trigger telegram TT arriving at the diagnosis server 90 automatically causes an activation of a diagnosis evaluator 92'. After its activation, this diagnosis evaluator 92' loads the plant symptom S, identifiable by its identifier, or a plurality of plant symptoms S identifiable from the identifier.

Moreover, linking rules VR, symptom descriptions SB, diagnosis texts DT including at least one therapy proposal TV, and symptom-specific confidence thresholds KS' are loaded from the memory 68 for symptom-specific knowledge SW. With the aid of the linking rules VR, a diagnosis D is derived from the symptom or the plant symptoms S. Linking rules VR, symptom descriptions SB, diagnosis texts DT and confidence thresholds KS' from other memories, such as the memory 70, for symptom-specific knowledge SW may be used as an aid.

Furthermore, the diagnosis D is assigned a significance value on the basis of the symptom-specific knowledge SW; this value is compared with the confidence thresholds KS' loaded by the diagnosis evaluator 92'. If the significance value of a diagnosis D for instance exceeds its associated confidence threshold KS', then the status information of the diagnosis D can be set from 0 to 1, for instance. Such a diagnosis is processed with special priority in the user surface 74 on the basis of the status information identifiable by "1". This can be done for instance in that diagnoses D having the status information 0 are typically displayed in a data display device operated in the scrolling mode, output at a printer, and "scrolled out" of the data display device after a certain period of time that depends on the number of subsequent diagnoses D. By comparison, a diagnosis with the status information 1 is for instance output on the data display device as a highlighted message and initially not scrolled out of the data display device. Not until the therapy which is based on this diagnosis D has led to success, which is equivalent to continued trouble-free operation of the technical plant, does this highlighted message disappear, and then like the diagnoses D provided with the status information 0 is scrolled out of the data display device and printed out for the sake of documentation.

In this way, just as in the previously described exemplary embodiment, an especially high information density is achieved. In this way, intervention by the operating staff is limited solely to situations in which trouble-free operation of the technical plant is threatened in some essential way.

The building blocks and components listed in the function diagrams may be present in a data processing system not only in the form of physical building blocks and components but can also be generated in virtual fashion as virtual reality by way of suitable software definitions. In this way, it is possible to have recourse to this diagnostic system or similar diagnostic systems 2, using work stations and personal computers as the core elements.

We claim:

1. A data processing system for monitoring operating states of a technical plant, comprising:
   a) a measuring level with means for obtaining measured values representative of operating states of a technical plant;
   b) a coupling level receiving the measured values from said measuring level, said coupling level having means for processing the measured values and for associating measurement-point-specific identifiers with the measured values;
   c) an administration level connected to said coupling level, said administration level including an identifier addressing block;
   d) an action level connected to said administration level, said action level including an action block with means for carrying out at least one of logical and arithmetic operations for determining at least one of plant symptoms, diagnoses, and respectively associated significance values;
   e) a data level communicating with said action level, said data level including data memory means for storing measured-value-specific rules, confidence rules, confidence thresholds, plant symptoms, diagnoses and measured values; and
   f) a display level with a user surface communicating with said data level and said action level.

2. A data processing system for monitoring operating states of a technical plant, comprising:

a) a simulation level with a data memory storing and issuing measured values characterizing operating states of a technical plant;

b) a coupling level communicating with and receiving the measured values from said simulation level, said coupling level including means for processing the measured values and adding thereto a measurement-point-specific identifier;

c) an administration level communicating with said coupling level, said administration level including an identifier addressing block;

d) an action level connected to said administration level, said action level including an action block with means for carrying out at least one of logical and arithmetic operations for determining at least one of plant symptoms, diagnoses, and respectively associated significance values;

e) a data level communicating with said action level, said data level including data memory means for storing measured-value-specific rules, confidence rules, confidence thresholds, plant symptoms, diagnoses and measured values; and f) a display level with a user surface communicating with said data level and said action level.

* * * * *